Dec. 15, 1970  K. O. KUESTER  3,546,732
HEADLAMP WASHER AND WIPER
Filed May 15, 1968
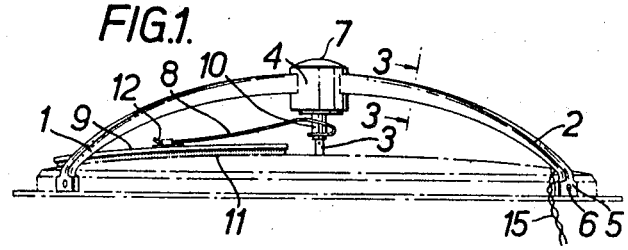
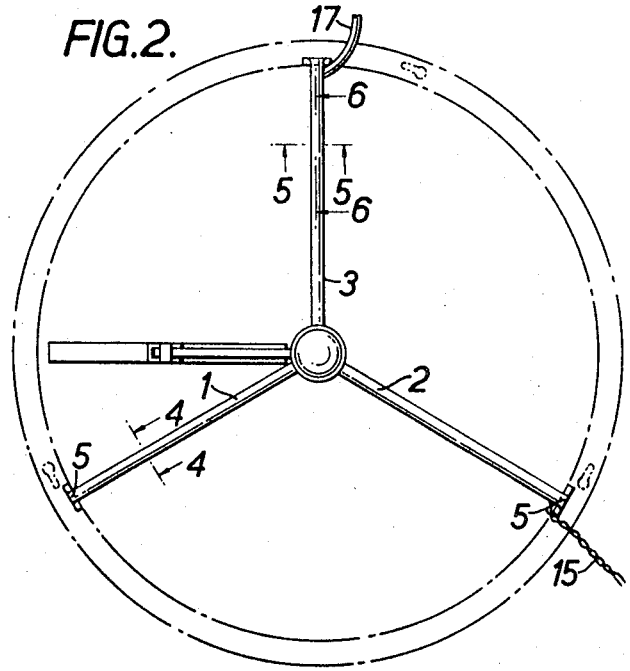
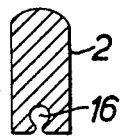
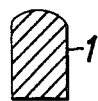
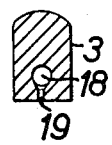
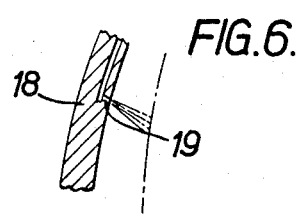
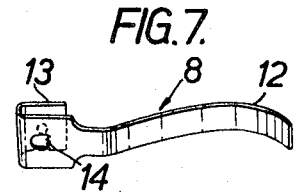

United States Patent Office 3,546,732
Patented Dec. 15, 1970

3,546,732
HEADLAMP WASHER AND WIPER
Karl Otto Kuester, 465 McClement Drive,
Collins Bay-Kingston, Ontario, Canada
Filed May 15, 1968, Ser. No. 729,350
Claims priority, application Canada, Mar. 28, 1968,
16,126
Int. Cl. B60s 1/52
U.S. Cl. 15—250.01                               6 Claims

ABSTRACT OF THE DISCLOSURE

A headlamp washer and wiper having a jet for spraying fluid onto a headlamp and a wiper blade which rotates from a position above the centre of the headlamp for removing grime.

---

This invention relates to a headlamp washer and wiper apparatus which can be fitted to a headlamp without any modifications having to be made to the headlamp mounting arrangement.

It is general knowledge that, when driving vehicles in wet weather or upon dirty highways, the headlamps accumulate deposits of road grime which seriously affect their light output. Under normal road conditions, road grime builds up at a slower rate. However, it has been determined that even a very slight deposit which is not readily noticeable upon a headlamp, can reduce the light output by over 30%. This situation is not readily appreciated by the general public in that, a 30% reduction in light output from a headlamp is not easily discernible until a driving error brings one's attention to it.

It is impracticable to regularly clean the headlamps manually when driving on a highway, and hence there is a need for a headlamp cleaning device which is reliable in operation, can be operated while the vehicle is in motion, and does not reduce the light output to any significant extent even during its cleaning operation. It is also preferable that the headlamp cleaning device be of low cost as it will be competing for sales in the highly competitive altomobile accessory market.

Numerous attempts have been made to design an apparatus which would effectively clean the headlamps of a vehicle, one example being the type shown in Canadian Patent No. 662,077 issued on Apr. 30, 1963 to Herrington. The apparatus used in this Canadian patent is comprised of a wind-driven propellor driving a wiper blade, and obviously there will normally be only enough power to operate the wiper blade when the vehicle fitted with the apparatus is driven at highway speeds, and even under those conditions the power from the propellor will be barely adequate. No washing arrangement is disclosed by Herrington and hence, unless it is raining, the headlamp surface will be scratched when an attempt is made to clean it, due to the grime on the headlamp being of an abrasive nature when dry.

Other types of known apparatus are such as those disclosed in the United States patents to S. C. Pollock, U.S. Pat. No. 3,058,142 being representative. In this type of arrangement an arifice is arranged above a headlamp so that a water jet can be directed downwardly onto the headlamp. Although this ararngement may be adequate for cleaning a headlamp covered with a slight deposit of road grime when the vehicle fitted with the apparatus is stationary, it will not adequately clean a large deposit of road grime from a headlamp. It is also unlikely that the water jet will even contact the headlamp when the vehicle is travelling at highway speeds, due to the influence of the upward air flow normally produced in the region of a headlamp.

The apparatus of this invention is of a simple design and is easy to install as it does not normally entail making any modifications to the normal headlamp mounting. It also presents only a very small obstruction to the light output from the headlamp as the bulk of the operating mechanism is situated in the central dark area of the headlamp. The apparatus can also be made in an attractive manner so that it is inconspicuous, and can also be made very inexpensively so as to be within the price range of normal vehicle accessories such as windshield washers, foglights, ect.

The apparatus consists generally of a miniature type rotary motor which can be mounted in front of the center of a headlamp. The rotary motor drives a wiper blade which is normally in contact with the headlamp. An orifice is positioned so that a jet of cleaning fluid similar to that used in conventional windshield washers can be sprayed onto the headlamp. It has been determined that the most suitable position for the orifice is in front of the lower half of the headlamp and more specifically directly below the central area of the headlamp, as it is from this position that a jet of cleaning fluid is most likely to be sprayed onto the headlamp at any normal highway speed. Other positions of the orifice may, however be suitable depending upon the distinctive air flow produced over headlamps by different vehicle body styles. Preferably an electric motor is used to drive the wiper blade, either directly or through a radially disposed wiper blade arm, although any other type of equivalent prime mover could be used. The motor can be mounted on a support arm having a securing lug at its free end which can be secured to a standard headlamp rim either by a self-tapping screw or any alternative means such as a clamping ring around the headlamp rim.

Preferably when the apparatus is in place on a vehicle, the cleaning fluid can be lead to the orifice through a branched connection from the windshield washer piping already in the vehicle, while the electrical input for the motor can be obtained from a terminal which will deliver power only when the windshield washer is being operated. The apparatus is thus preferably connected so that it will be operated only when the windshield washer is being operated.

A preferred embodiment of the apparatus will now be described with reference to the accompanying drawings in which:

FIG. 1 is a side elevation of an embodiment of the apparatus of this invention,

FIG. 2 is a plan view of the apparatus of FIG. 1,

FIG. 3 is an enlarged cross sectional view on line 3—3 of FIG. 1,

FIG. 4 is an enlarged cross sectional view on 4—4 of FIG. 2,

FIG. 5 is an enlarged cross sectional view on 5—5 of FIG. 2,

FIG. 6 is a partial enlarged cross sectional view on 6—6 of FIG. 2,

FIG. 7 is an enlarged perspective view of the wiper arm.

Referring to FIGS. 1 and 2, the headlamp washer and wiper apparatus consists of radially disposed arcuate support arms 1, 2 and 3, integrally molded with, brazed onto, or suitably attached to a motor mounting member in the form of a ring 4. These support arms can be made from aluminum, stainless steel or any suitable semirigid plastic. The free ends of the support arms are flattened to form mounting lugs 5, these lugs having a formed hole 6 through which a self-tapping metal screw (not shown) can be placed to secure the apparatus to a headlamp rim, the outline of which is shown in broken lines.

A miniature electric motor 7, which can include an integral gear reduction unit, if required, is fitted snugly into the motor mounting ring 4 so that no movement can occur between the motor and the mounting ring, and yet it can be easily removed for repair or replacement. A motor which is found to be of a suitable size and power output for this apparatus is obtainable through Feinmechanische Werkstaetten, Schoenaich/Wuertt., West Germany under the manufacturers Type No. 033/005.

A wiper blade arm 8, as detailed in FIG. 7, connects a wiper blade 9 to the motor shaft 10. The wiper blade has a felt rubbing surface 11, although any satisfactory type of known wiping material such as rubber, plastic, etc. can be used. The wiper blade arm 8 has a conventional curved end 12 which connects it to the wiper blade 9, and a spring clip end 13 which can be nipped together with the fingers, pushed onto the motor shaft 10 and released to grip the arm 8 securely to the motor shaft. The teeth 14 on the wiper blade arm 8 prevent rotary movement between the motor shaft 10 and the wiper blade arm.

The power supply to the motor 7 is conveniently led in through wire 15 which is held in a groove 16 formed in support arm 2 (see FIG. 3).

Cleaning fluid is introduced onto the headlamp by means of a pipe 17 connected to the support arm 3 to feed fluid into passageway 18 to be sprayed through an orifice 19 (see FIGS. 5 and 6).

To install the apparatus onto a vehicle headlamp it is merely necessary, in the majority of installations, to place the apparatus in position, drill three holes in the head lamp retainer ring, and use three self-tapping screws through the mounting lugs 5 to hold the apparatus securely in place. The pipe 17 for the cleaning fluid is attached to the existing piping in an automobile which normally supplies the cleaning fluid to the windshield, and the wire 15 is attached to the electrical circuit which is energized when the windshield is being washed. This circuit will either be the windshield washer pump circuit or the windshield washer wiper circuit which is only energized during windshield washer operation. By connecting the apparatus in this manner, it is ensured that the wiper blade of the apparatus is not rotated on the headlamp in the absence of cleaning fluid.

It has been found that if the wiper blade is rotated at a speed of from 200 to 300 r.p.m., the cleaning fluid will be distributed in a film over the headlamp and, through centrifugal action, the dissolved road grime will be thrown from the periphery of the headlamp.

Although the embodiment described shows the use of three support arms, the number of support arms used is not critical and it is to be understood that the apparatus could be designed to make use of only one support arm which could include the orifice for the cleaning fluid and also serve as a support for the electrical wire.

Also, one wiper blade has been shown which is supported on a wiper blade arm, however it is understandable that the wiper blade arm need not be used and the wiper blade could be resiliently attached directly to the motor shaft. Two or more wiper blades could also be used if it is found that they are necessary to achieve adequate cleaning of the headlamp.

For achieving desired operation in icy weather; it should also be appreciated that coating of the surfaces of the apparatus which will face the headlamp, with a black finish will assist in permitting the apparatus to absorb heat emitted from the headlamp, so as to aid in keeping the mechanism and the wiper blade in operative condition.

I claim:
1. A headlamp washer and wiper apparatus consisting of:
   a support arm;
   a motor mounting means on the support arm;
   a rotary motor secured to said mounting means, and mounted so that the motor is located in front of the central area of the headlamp;
   a wiper blade secured to shaft of said motor, whereby the wiper blade is driven across the face of said headlamp;
   said support arm being provided with a conduit for conducting cleaning fluid through said support arm to a discharge orifice, said orifice being disposed along said support arm and between the central area of the headlamp and the outer circumference of the headlamp so as to be located in front of the headlamp and so as to direct a jet of cleaning fluid onto the headlamp.
2. An apparatus as in claim 1 wherein there are three support arms positioned radially to one another with the motor mounting means situated at the juncture of the support arms.
3. An apparatus as in claim 1, wherein the orifice and a passageway are formed in said support arm such that cleaning fluid can be fed along said passageway and through said orifice.
4. An apparatus as in claim 2, wherein a lug is formed on the free end of each of the support arms, the lugs being located such that they will be a sliding fit on a headlamp rim when the apparatus is mounted in position on a headlamp.
5. An apparatus as in claim 4, wherein a hole is formed in each lug to accommodate a fastening screw which can hold the apparatus in place on a headlamp.
6. An apparatus as in claim 1, wherein the motor is electrically driven and the support arm is formed with a groove for accommodating an electric wire for the motor power supply.

References Cited

UNITED STATES PATENTS

| 2,239,754 | 4/1941  | Marti  | 15—250.22 X |
| 2,388,500 | 11/1945 | Schaal | 15—250.01   |
| 3,072,947 | 1/1963  | Bryant | 15—250.22   |

FOREIGN PATENTS

| 676,967 | 12/1963 | Canada | 15—250.01 |

ROBERT W. MICHELL, Primary Examiner